3,005,719
PROCESS OF DEHYDRATING WALNUTS
Louis B. Rockland, Pasadena, and Edison Lowe, El Cerrito, Calif., assignors to the United States of America as represented by the Secretary of Agriculture
No Drawing. Filed July 19, 1960, Ser. No. 43,964
4 Claims. (Cl. 99—199)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its prime object the provision of novel processes for dehydrating walnuts.

In preparing walnut kernels for the market, it is necessary to dehydrate them to ensure maximum stability. Thus, it is known in the art that walnut kernels are most stable when their moisture content is in the range of 3.5±0.3%. At moisture contents above or below this optimum level there is more rapid darkening of the kernels and accelerated development of rancidity.

Various methods have been proposed for dehydrating walnuts. These methods generally involve contacting the nuts (in-shell or separated kernels) with currents of air. The known procedures suffer from the disadvantage that where the drying rate is accelerated by applying air at higher temperatures the quality of the nuts is impaired, or, where the drying rate is decreased by lowering the air temperature, the process takes an inordinately long time.

In accordance with the invention, the dehydration of the kernels is accomplished in two distinct stages whereby several advantages over prior methods are realized. Basically, the process of the invention involves first exposing the in-shell nuts to hot air for a brief period of time followed by holding them, still in the in-shell condition, at ambient temperatures. Thereby the moisture content of the kernels is reduced from the original level—which is generally about 4 to 5%—down to the optimum level, that is, 3.5±0.3%. The procedure of the invention is described in more detail as follows:

In the first stage, the in-shell (whole) walnuts are subjected to a current of hot air, at a temperature of about from 175 to 200° F. This process is continued for only a brief period of time, about 10 to 45 minutes, depending on such factors as air temperature, original moisture content of the nuts, and the degree of contact between the air and the nuts. During this stage the shells are substantially dehydrated whereas there is only a minor degree of dehydration of the kernels. As a matter of fact, the kernels may even increase in moisture content due to diffusion of moisture vapor and from the shells to the kernels. Also, during this stage the kernels may become quite elevated in temperature. Thus, depending on the external temperature, they may reach temperatures as high as 130–145° F. However, these are safe temperatures so that there is no discernible damage to the quality of the nuts. In this stage of the process, air temperatures much above 200° F. are not advisable. For example, in an experimental run wherein the air temperature was at 225° F., the kernels reached a temperature of 150° F. and the product after the storage period was found to have developed a detectable off-flavor. Generally, an air temperature of about 200° F. is preferred as this provides rapid dehydration action without causing any damage to the flavor or color of the kernels.

Following the hot air dehydration step, the nuts, still in the in-shell condition, are allowed to stand at ambient (room) temperature in a closed container to permit dehydration of the kernels, per se. During this holding period the dried shells act as a desiccating agent in that there is a diffusion of moisture from the kernels to the shells, this process continuing until the point is reached when the moisture content of kernels and that of the shells are in equilibrium. The holding of the nuts is continued for a period of about 2 to 8 days to ensure proper diffusion of moisture. During this period the kernels are at ordinary temperatures so that no damage to quality occurs. Following the storage period the kernels, now at the optimum moisture level, are removed from the shells in conventional manner and are then ready for use or sale. Preferably, the kernels are packaged in moisture-impermeable containers so that they will remain at the optimum moisture level during storage until consumed. Prior to packaging, the kernels may be coated with conventional fat-stabilizing antioxidants to further increase their shelf-life.

A prime advantage of the process of the invention is that the hot-air dehydration is accomplished very rapidly in contrast to the long periods involved when walnuts are brought to the optimum moisture level by known procedures, for example, by contacting them with air at temperatures not above 110° F. It is realized that in the process of the invention, a long period of time is required for the holding period. This, however, is no problem because the holding requires no special equipment. Thus the nuts may simply be kept in sealed bins or other closed receptacles or storages rooms in the factory. The important point is that the regular dehydration equipment is not being used during this holding period but is available for use in other applications or treating fresh batches of nuts. Thus, by applying the process of the invention, the time that the dehydration equipment is in actual use is reduced by as much as 50 to 75%.

Another advantage of the process of the invention is that the nuts are treated while in the in-shell condition. This means that the kernels are protected from the abrasive forces commonly encountered when separated kernels are subjected to drying. It may be noted at this point that abrasive forces are highly deleterious because they cause separation of the thin pellicle which surrounds the kernel. This pellicle contains natural protective (antioxidant) principles and removal of it increases the susceptibility of the kernel to develop rancidity. Moreover, abrasion of the kernels causes an extrusion or oozing of the natural oil contained therein. When the oil is thus exposed to the atmosphere, the nuts will develop off-flavor more rapidly through oxidative changes.

Further, by handling the nuts in the in-shell condition, in accordance with the invention, breakage of the kernels is prevented. Such breakage—common in dehydrating separated kernels—lowers the value of the final product.

Another point is that in applying the present invention, the shells are broken and the kernels separated after the dehydration is completed. Because of the low moisture content of the nuts at this stage, the shells are quite brittle and can be broken more readily without damage to the kernels than is the case where nuts of natural moisture content are broken to segregate the kernels.

The first stage of the present process is preferably accomplished with the belt trough drier disclosed by Lowe and Durkee (Patent No. 2,876,558). In this device the walnuts are in the form of a bed of uniform depth, are subjected to an upwardly directed stream of hot air. The continuous traverse of the belt causes a continuous tumbling of the individual nuts within the bed whereby the drying takes place rapidly and uniformly.

The invention is further demonstrated by the following examples:

Example I

The starting material was a batch of in-shell English walnuts, which after harvesting had been subjected to conventional drying to reduce the moisture content of the kernels to 4.4%.

The in-shell nuts were first subjected to drying in the belt-trough drier (Patent 2,876,558). In the drier, the nuts were disposed as a bed 7 inches deep, representing about 110 lbs. of in-shell nuts. Air at 200° F. was forced up through the bed of nuts at a velocity of 7.5 ft. per minute. Belt speed was 7.5 ft. per minute. Three batches of nuts were so treated—one for 10 minutes, one for 20 minutes, and one for 30 minutes. Samples of the three batches were removed and the moisture contents of the kernels determined.

The so-treated nuts, still in the in-shell condition, were then placed in sealed glass jars and held at ambient temperatures (70-80° F.) for 8 days. At the end of this time the products were tested for moisture content. The results are tabulated below:

| Run | Time in hot-air drier, Min. | Moisture content of kernels after hot-air drying | Moisture content of kernels after hot-air drying and storage |
| --- | --- | --- | --- |
| A | 10 | 4.42 | 3.82 |
| B | 20 | 4.12 | 3.42 |
| C | 30 | 3.95 | 3.25 |

The products were tasted and found to be of excellent natural flavor.

Example II

The process as described above was repeated except that in this case the air in the belt-trough drier was at 175° F. and the drying was continued for about 40 minutes. The kernels after drying had a moisture content of 4%, which decreased to 3.3% after storage. The products had excellent natural flavor.

Having thus described the invention, what is claimed is:

1. A method for dehydrating walnuts to reduce the moisture content of the kernels from a level of about from 4 to 5% to the optimum level for stability which comprises exposing in-shell walnuts to a current of air at about 175° to 200° F. for a period of time within the range of about 10 to 45 minutes, sufficient only to obtain substantial dehydration of the shells without reducing the moisture content of the kernels to the optimum level, discontinuing the exposure of the nuts to the current of hot air, and holding the so-treated in-shell nuts at ambient temperatures until the moisture content of the kernels is reduced to the optimum level, 3.2 to 3.8%, by diffusion of moisture from the kernels to the shells.

2. A method for dehydrating walnuts to reduce the moisture content of the kernels from a level of about from 4 to 5% to the optimum level for stability which comprises exposing in-shell walnuts to a current of air at about 200° F. while continuously tumbling the nuts to expose all surfaces thereof to the air current, continuing said exposure for a period of about from 10 to 30 minutes, sufficient only to obtain substantial dehydration of the shells without reducing the moisture content of the kernels to the optimum level, discontinuing the exposure of the nuts to the current of hot air, and holding the so-treated in-shell nuts at ambient temperatures until the moisture content of the kernels is reduced to the optimum level, 3.2 to 3.8%, by diffusion of moisture from the kernels to the shells.

3. A method for dehydrating walnuts to reduce the moisture content of the kernels to the optimum level for stability which comprises providing in-shell walnuts the kernels in which contain about from 4 to 5% moisture, exposing said in-shell walnuts to a current of air at about from 175 to 200° F. for a period of time within the range of about from 10 to 45 minutes, sufficient only to obtain substantial dehydration of the shells without reducing the moisture content of the kernels to the optimum level and without heating the kernels to a temperature higher than 145° F., discontinuing the exposure of the nuts to the said current of hot air, and holding the nuts still in the in-shell condition at ambient temperatures in a closed container until the moisture content of the kernels is reduced to the optimum level, 3.2 to 3.8%, by diffusion of moisture from the kernels to the shells.

4. The method of claim 3 wherein the said current of air is at about 200° F. and wherein the nuts throughout their contact with said current of air are maintained in the form of a bed of uniform thickness within which the individual nuts are continually tumbled to expose all surfaces to the current of hot air.

References Cited in the file of this patent
UNITED STATES PATENTS
2,816,839   Rockland _____ Dec. 17, 1957